United States Patent
Chou et al.

(10) Patent No.: US 9,363,727 B2
(45) Date of Patent: Jun. 7, 2016

(54) SYSTEM AND METHOD OF CELL OUTAGE COMPENSATION IN CELLULAR SYSTEMS

(71) Applicants: Joey Chou, Scottsdale, AZ (US); Jorge Mena, Moreno Valley, CA (US)

(72) Inventors: Joey Chou, Scottsdale, AZ (US); Jorge Mena, Moreno Valley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/124,457

(22) PCT Filed: Oct. 29, 2013

(86) PCT No.: PCT/US2013/067317
§ 371 (c)(1),
(2) Date: Dec. 6, 2013

(87) PCT Pub. No.: WO2014/070778
PCT Pub. Date: May 8, 2014

(65) Prior Publication Data
US 2014/0295856 A1    Oct. 2, 2014

Related U.S. Application Data

(60) Provisional application No. 61/721,436, filed on Nov. 1, 2012.

(51) Int. Cl.
*H04W 36/20* (2009.01)
*H04W 28/24* (2009.01)
(Continued)

(52) U.S. Cl.
CPC ............. *H04W 36/20* (2013.01); *H04B 7/0417* (2013.01); *H04B 7/0452* (2013.01); *H04B 7/0626* (2013.01); *H04J 3/0614* (2013.01); *H04L 5/0046* (2013.01); *H04L 5/0048* (2013.01); *H04L 61/3005* (2013.01); *H04L 61/3075* (2013.01); *H04W 4/005* (2013.01);
(Continued)

(58) Field of Classification Search
None
See application file for complete search history.

(56) References Cited

U.S. PATENT DOCUMENTS

| 2001/0051994 A1 | 12/2001 | Serizawa et al. |
| 2008/0188247 A1 | 8/2008 | Worrall |

(Continued)

FOREIGN PATENT DOCUMENTS

| EP | 2154918 A1 | 2/2010 |
| EP | 2369883 A1 | 9/2011 |

(Continued)

OTHER PUBLICATIONS

"3GPP MTC Standard TTA M2M Seminar", ETRI Standards Research Center, [Online] retrieved from the internet: <edu.tta.or.kr/sub3/down.php?No=123&file=M2M_1-4.pdf>, (Oct. 23, 2012).

(Continued)

*Primary Examiner* — Hilina K Demeter
(74) *Attorney, Agent, or Firm* — Schwegman Lundberg & Woessner, P.A.

(57) ABSTRACT

Disclosed in some examples are systems, methods, and machine-readable mediums in which the COC functionality is enhanced to provide for compensation of both a first cell that experiences an outage and a second cell that is being compensated for by the first cell upon an identified outage of the first cell. In some examples, messaging fields for messaging interfaces and database fields are modified to allow the compensation state of the first cell to be determined and/or saved.

22 Claims, 10 Drawing Sheets

(51) Int. Cl.

| | | |
|---|---|---|
| *H04W 52/02* | (2009.01) | |
| *H04W 24/08* | (2009.01) | |
| *H04J 3/06* | (2006.01) | |
| *H04L 5/00* | (2006.01) | |
| *H04W 16/24* | (2009.01) | |
| *H04W 8/00* | (2009.01) | |
| *H04W 72/04* | (2009.01) | |
| *H04W 76/02* | (2009.01) | |
| *H04B 7/04* | (2006.01) | |
| *H04B 7/06* | (2006.01) | |
| *H04W 28/02* | (2009.01) | |
| *H04W 4/00* | (2009.01) | |
| *H04W 76/04* | (2009.01) | |
| *H04L 29/12* | (2006.01) | |
| *H04W 16/20* | (2009.01) | |
| *H04W 16/26* | (2009.01) | |
| *H04W 60/04* | (2009.01) | |
| *H04W 64/00* | (2009.01) | |
| *H04W 36/14* | (2009.01) | |

(52) U.S. Cl.
CPC .............. *H04W 8/005* (2013.01); *H04W 16/20* (2013.01); *H04W 16/24* (2013.01); *H04W 16/26* (2013.01); *H04W 24/08* (2013.01); *H04W 28/0268* (2013.01); *H04W 28/24* (2013.01); *H04W 36/14* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 76/023* (2013.01); *H04W 76/046* (2013.01); *Y02B 60/50* (2013.01)

(56) References Cited

U.S. PATENT DOCUMENTS

| | | | |
|---|---|---|---|
| 2010/0216453 A1* | 8/2010 | Kallin | H04W 48/20 455/424 |
| 2010/0278038 A1 | 11/2010 | Stahle et al. | |
| 2011/0038326 A1 | 2/2011 | Davies et al. | |
| 2011/0044165 A1* | 2/2011 | Ni | H04W 24/04 370/221 |
| 2011/0059744 A1 | 3/2011 | Won et al. | |
| 2011/0110347 A1 | 5/2011 | Mun | |
| 2011/0149728 A1 | 6/2011 | Lee | |
| 2011/0190000 A1 | 8/2011 | Kwun | |
| 2011/0310769 A1 | 12/2011 | Lee et al. | |
| 2011/0319065 A1 | 12/2011 | Dalsgaard et al. | |
| 2012/0155406 A1 | 6/2012 | Kim et al. | |
| 2012/0213057 A1 | 8/2012 | Zhang et al. | |
| 2012/0252518 A1 | 10/2012 | Karampatsis et al. | |
| 2013/0005385 A1* | 1/2013 | Hunukumbure | H04W 16/22 455/517 |
| 2013/0053024 A1* | 2/2013 | Zou | H04W 52/0206 455/424 |
| 2013/0080597 A1 | 3/2013 | Liao | |
| 2013/0303206 A1 | 11/2013 | Starsinic et al. | |
| 2014/0016614 A1 | 1/2014 | Velev et al. | |
| 2014/0113667 A1 | 4/2014 | Keller et al. | |
| 2014/0269779 A1 | 9/2014 | Shan et al. | |
| 2014/0357259 A1* | 12/2014 | Tomeczko | H04W 24/04 455/423 |

FOREIGN PATENT DOCUMENTS

| | | |
|---|---|---|
| KR | 1020110011145 A | 2/2011 |
| KR | 1020120094369 A | 8/2012 |
| KR | 1020120096408 A | 8/2012 |
| WO | WO-2014070649 A1 | 5/2014 |
| WO | WO-2014070778 A1 | 5/2014 |
| WO | WO-2014070901 A1 | 5/2014 |
| WO | WO-2014070929 A1 | 5/2014 |

OTHER PUBLICATIONS

"U.S. Appl. No. 14/126,611, Non Final Office Action mailed Oct. 23, 2014", 10 pgs.

"The Mobile Broadband Standard", 3GPP List of Work Items, [Online] retrieved from the internet: <http://www.3gpp.org/DynaReport/WI-List.html>.

"3GPP TSG-SA5 Meeting #86 Change Request 32.762", New Orleans. S5-123029., (Nov. 12, 2012), 14 pgs.

"U.S. Appl. No. 14/124,939, Preliminary Amendment filed Dec. 9, 2013", 9 pgs.

"U.S. Appl. No. 14/126,611, Preliminary Amendment filed Dec. 16, 2013", 11 pgs.

"Evaluation of MTC Device triggering", HTC, TD S2-110732, 3GPP TSG SA WG2 Meeting #83, (Feb. 2011), 2 pgs.

"International Application Serial No. PCT/US2013/067043, International Search Report mailed Feb. 25, 2014", 4 pgs.

"International Application Serial No. PCT/US2013/067043, Written Opinion mailed Feb. 25, 2014", 6 pgs.

"International Application Serial No. PCT/US2013/067317, International Search Report mailed Feb. 7, 2014", 3 pgs.

"International Application Serial No. PCT/US2013/067317, Written Opinion mailed Feb. 7, 2014", 7 pgs.

"International Application Serial No. PCT/US2013/067522, International Search Report mailed Feb. 12, 2014", 3 pgs.

"International Application Serial No. PCT/US2013/067522, Written Opinion mailed Feb. 12, 2014", 6 pgs.

"International Application Serial No. PCT/US2013/067575, International Search Report mailed Feb. 21, 2014", 3 pgs.

"International Application Serial No. PCT/US2013/067575, Written Opinion mailed Feb. 21, 2014", 6 pgs.

"Telecommunication management; Self-Organizing Networks (SON); Self-healing concepts and requirements", 3GPP TS 32.541 V10.0.0. Technical Specification Group Services and System Aspects. Release 10., (Mar. 2011), 21 pgs.

"Triggering a detached MTC device", InterDigital Communications, TD S2-110673, 3GPP TSG SA WG2 Meeting #83, (Feb. 2011), 4 pgs.

"TSG-SA5 Meeting #86 Change Request 32.766", New Orleans. S5-123194., (Nov. 12, 2012), 26 pgs.

"International Application Serial No. PCT/US2013/067317, International Preliminary Report on Patentability mailed May 14, 2015", 9 pgs.

* cited by examiner

SYSTEM AND METHOD OF CELL OUTAGE COMPENSATION IN CELLULAR SYSTEMS

PRIORITY CLAIM

This patent application is a U.S. National Stage Application under 35 U.S.C. 371 from International Application No. PCT/US2013/067317 filed Oct. 29, 2013 which claims the benefit of priority to U.S. Provisional Patent Application Ser. No. 61/721,436, entitled "Advanced Wireless Communication Systems and Techniques," filed on Nov. 1, 2012, each of which are hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, All Rights Reserved.

TECHNICAL FIELD

Embodiments pertain to Self-Organizing Wireless Networks. Some embodiments relate to Cell Outage Compensation.

BACKGROUND

As wireless networks evolve, new solutions are being developed which allow the networks to configure themselves, heal themselves, and optimize themselves. These networks are commonly called Self-Organizing networks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

When a cell goes out of service or becomes overloaded in a wireless network, such as a Long Term Evolution (LTE) wireless network, a coverage hole opens in the network which prevents users from completing calls or using their data connections. These problems lead to decreased customer satisfaction. In order to prevent coverage holes, standards bodies (such as the Third Generation Partnership Project—3GPP) have developed Self Organizing Networks (SON) that include features to automatically compensate for a cell outage. "Cell outage compensation" (COC) is a feature in SONs that automatically adjusts one or more neighboring cells to compensate for the coverage hole produced by the cell that is experiencing the outage. A cell outage may be a total outage in the sense that the cell is completely unavailable, or an outage which results from an overload of traffic. The reconfiguration of the neighbor cells may include changing the transmission power, antenna tilt, antenna azimuth, or other parameters.

If a second cell that is compensating for a first cell experiencing an outage itself experiences an outage, current COC implementations do not have a mechanism of knowing that the second cell is compensating for the first cell. Currently, the COC function would simply compensate for the second cell, which would leave a coverage hole corresponding to the first cell.

Disclosed in some examples are systems, methods, and machine-readable mediums in which the COC functionality is enhanced to provide for compensation of both a first cell that experiences an outage and a second cell that is being compensated for by the first cell upon an identified outage of the first cell. In some examples, messaging fields for messaging interfaces and database fields are modified to allow the compensation state of the first cell to be determined and/or saved.

Figure 1:
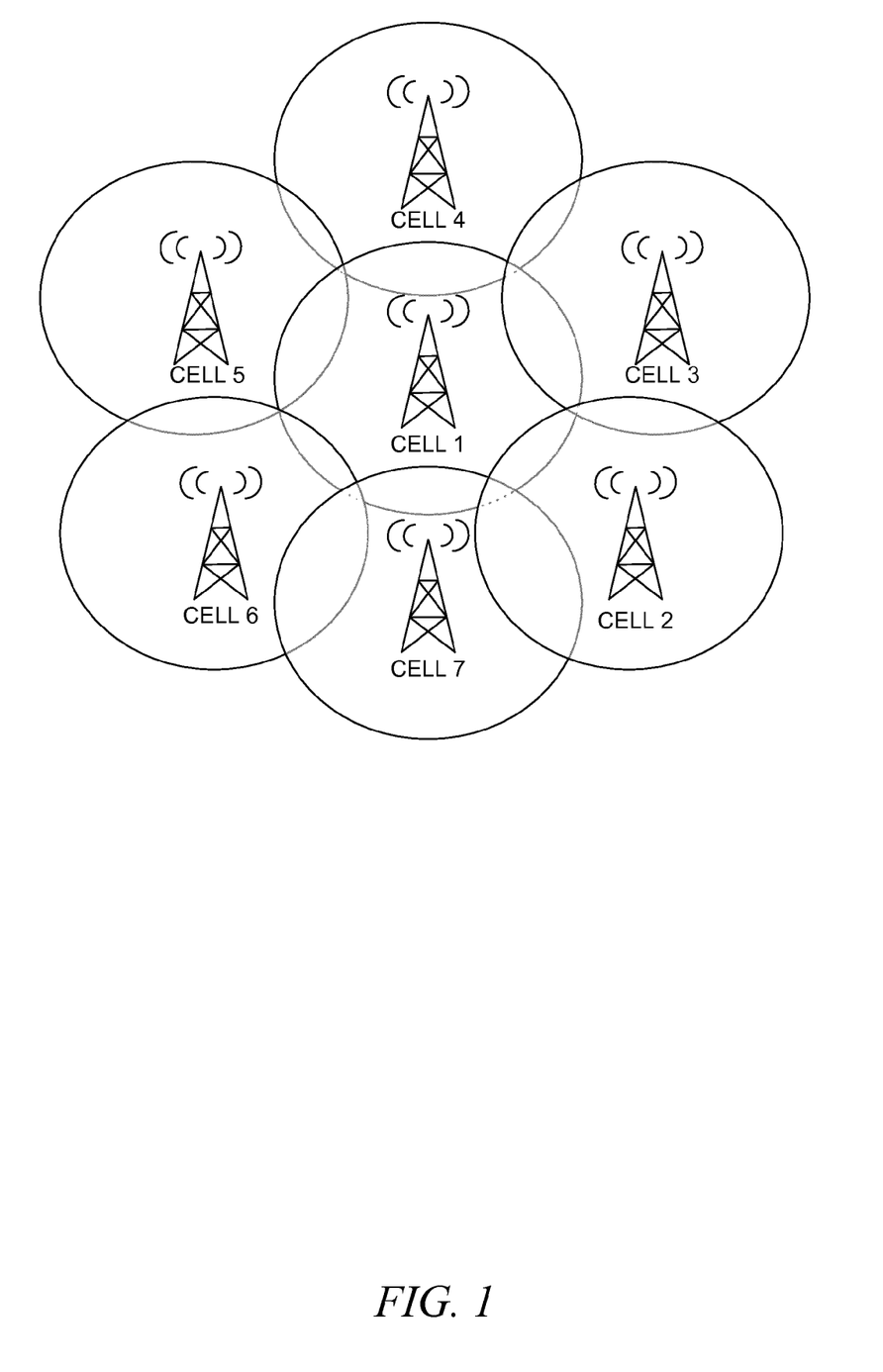
FIG. 1 shows a cell map with cells 1-7 according to some examples of the present disclosure.
Figure 2:
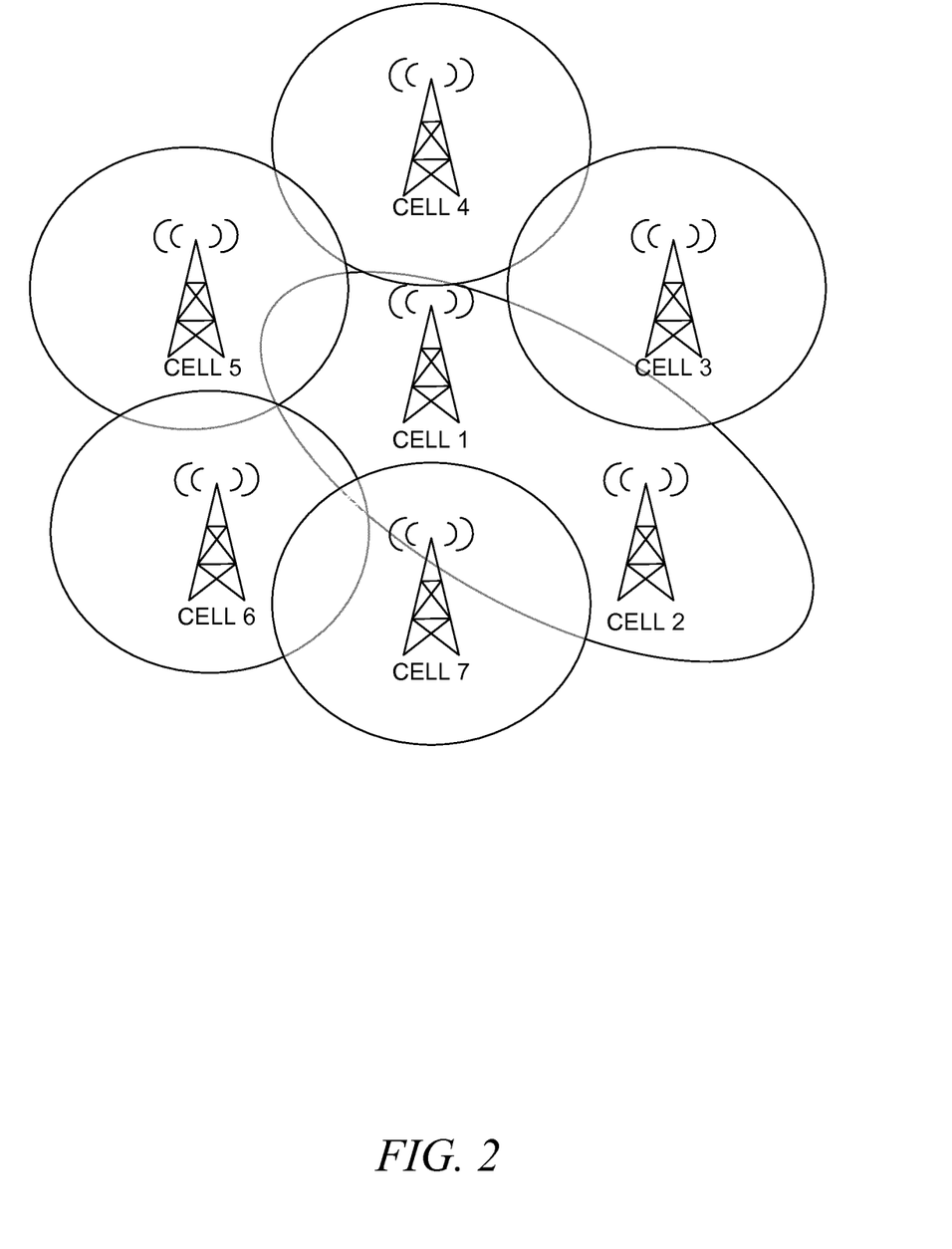
FIG. 2 shows a cell map with cells 1-7 according to some examples of the present disclosure with cell 2 compensating for cell 1.
Figure 3:
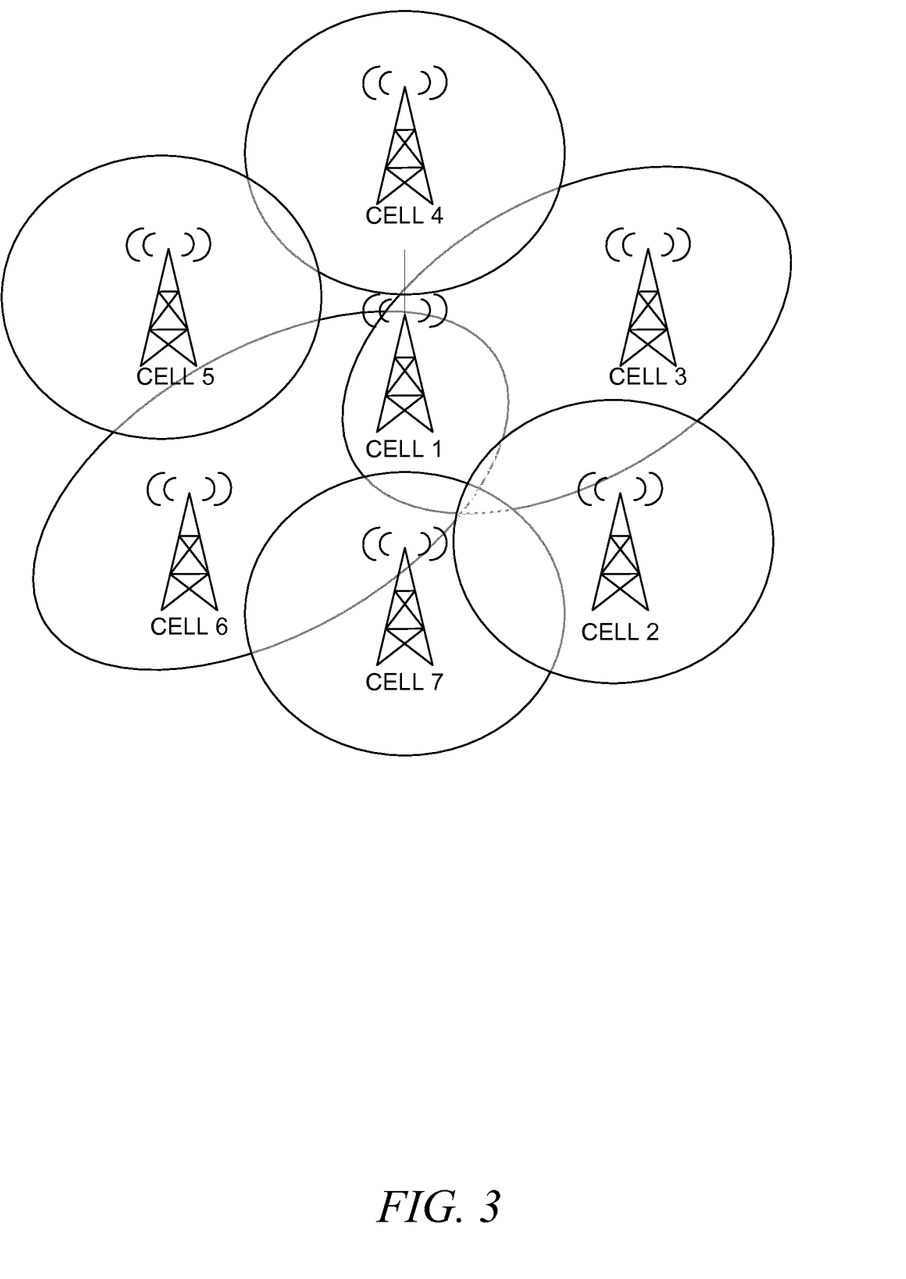
FIG. 3 shows a cell map with cells 1-7 according to some examples of the present disclosure with cells 3 and 6 compensating for cell 1.

Turning now to FIG. 1, a cell map is shown which shows cells 1-7 and approximate cell coverage areas represented by circles. If cell 1 experiences an outage, one or more of cells 2-7 may be reconfigured to compensate for the loss of coverage of cell 1. For example, in FIG. 2, cell 2 has been reconfigured to compensate for cell 1. In another example, as shown in FIG. 3, multiple cells can be utilized to compensate for the cell experiencing an outage. In FIG. 3, cells 3 and 6 are both compensating.

Figure 4:
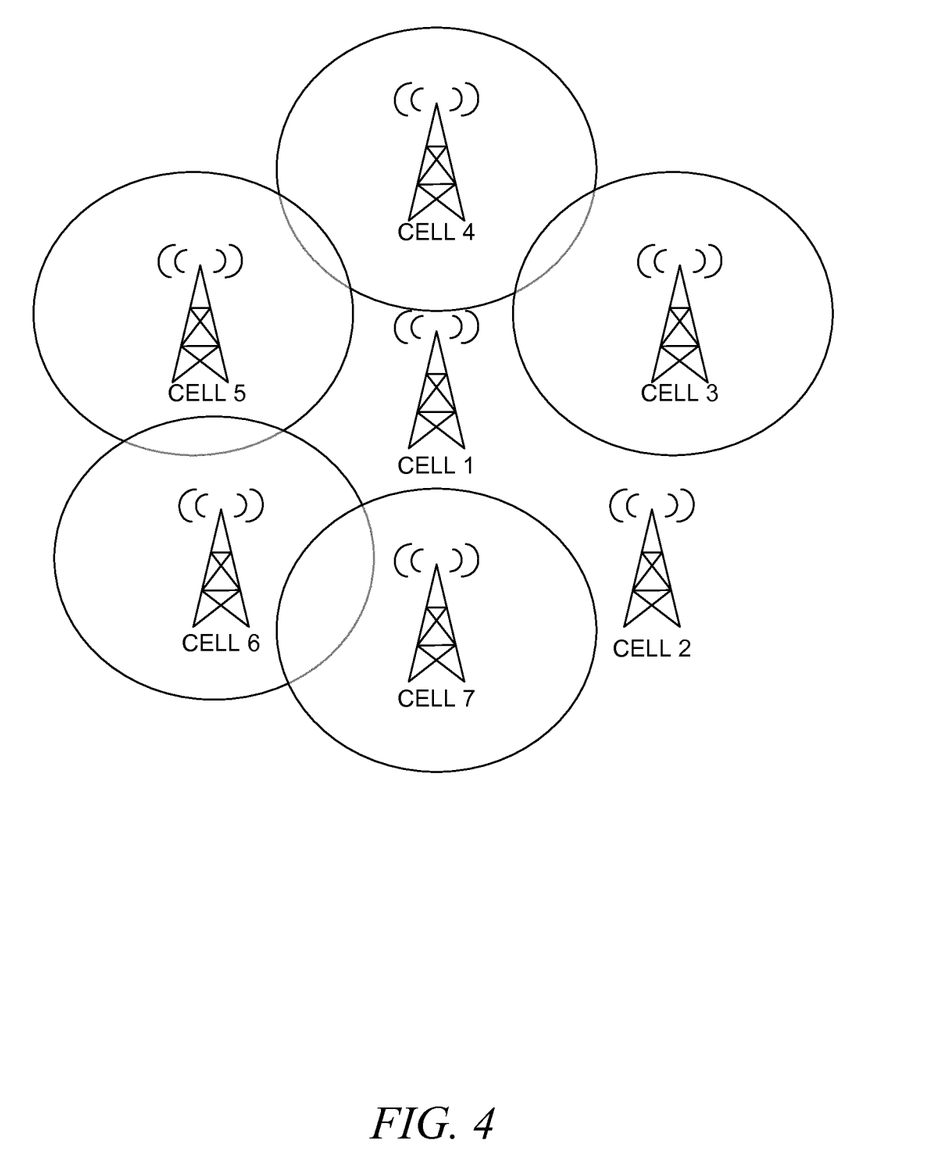
FIG. 4 shows a cell map with cells 1-7 according to some examples of the present disclosure with an outage at both cell 1 and cell 2.
Figure 5:
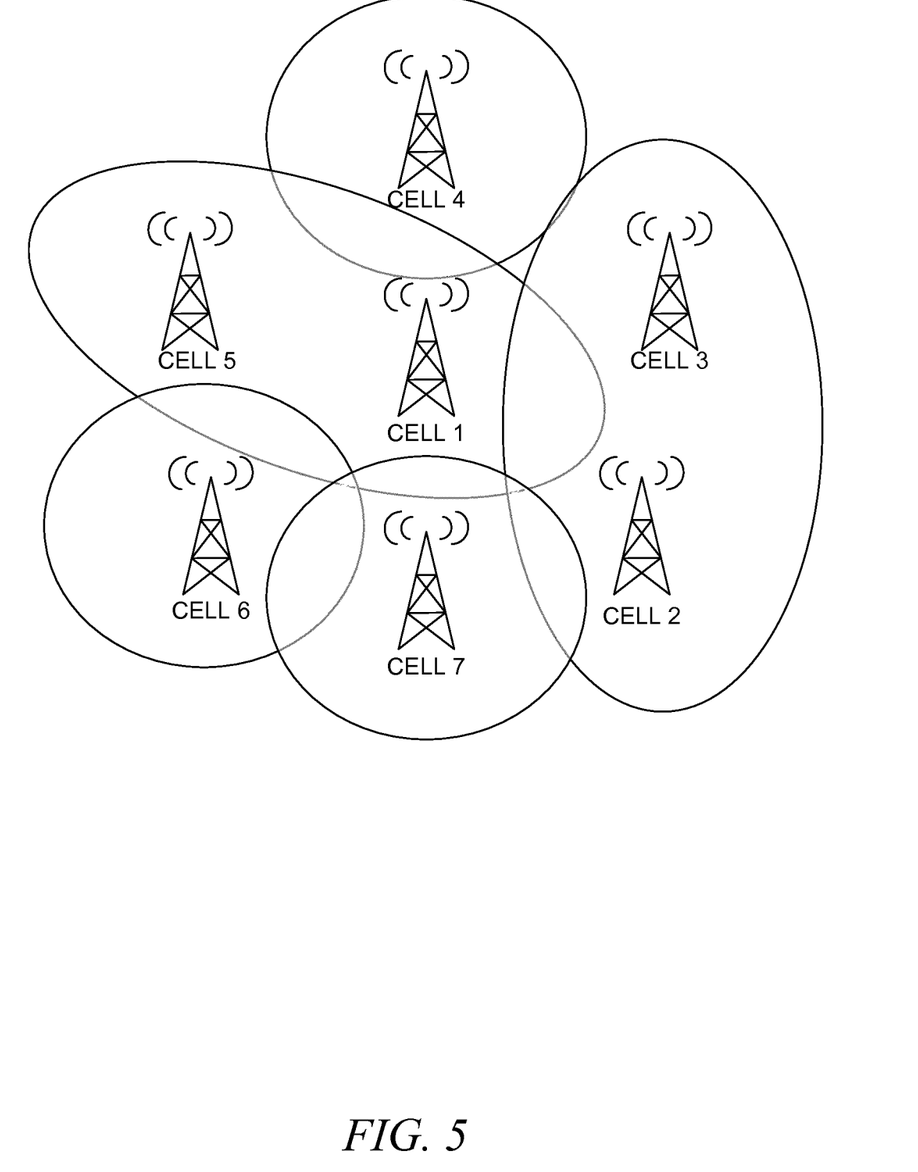
FIG. 5 shows a cell map with cells 1-7 according to some examples of the present disclosure with cells 3 and 5 compensating for cells 1 and 2.

Turning now to FIG. 4, if cell 2 was the only cell compensating for cell 1 and cell 2 experiences an outage, as can be seen in FIG. 4, there are now two coverage gaps. One coverage gap where cell 1 used to be and another where cell 2 used to be. According to some examples of the present invention, cell 2 maintains information that allows the COC system to ascertain that cell 2 was compensating for cell 1. Because the COC system has knowledge that cell 2 was compensating for cell 1, the system can compensate for both cell 1 and cell 2. In the example shown in FIG. 5, cell 5 is reconfigured to compensate for cell 1 and cell 3 is reconfigured to compensate for cell 2.

Figure 6:
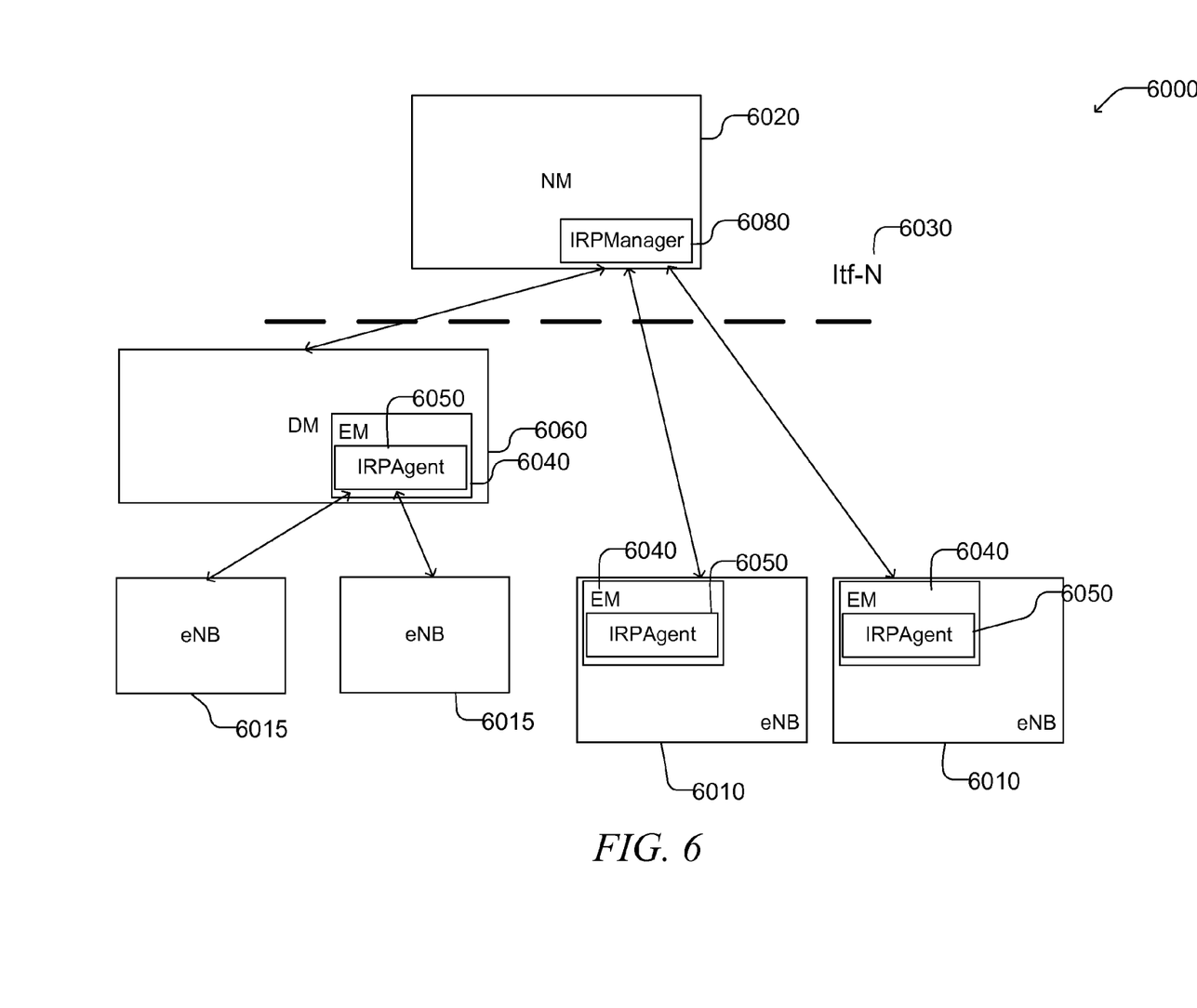
FIG. 6 shows a schematic of portions of a Long Term Evolution (LTE) wireless network according to some examples of the present disclosure.

Turning now to FIG. 6 portions of an example LTE wireless network 6000 are shown. eNodeBs 6010 and 6015 provide wireless connectivity for user equipment devices (UEs) (not shown). The eNodeBs provide one or more wireless "cells" which provide this connectivity. In some examples, the eNodeBs 6010 have element managers 6040 that are connected to a network manager (NM) 6020 through Interface-N (Itf-N) 6030. Element managers 6040 provide a package of end-user functions for management of a set of closely related types of network elements. An NM 6020 provides a package of end-user functions for the management of a network, mainly as supported by the EM(s) but it may also involve direct access to the Network Elements (e.g., the eNodeBs). For example, the NM may be responsible for management and provisioning of the eNodeBs and the cells on the eNodeBs. eNodeBs 6015 are connected to a Domain Management node which has an Element manager 6040. The DM 6060 also communicates with the NM 6020 across the Itf-N 6030. The Itf-N interface 6030 is defined by a number of Integration Reference Points (IRPs) which realize the functional capabilities of this interface. An IRP is a 3GPP architectural concept that is described by a set of specifications for definition of a certain aspect of the Itf-N comprising a requirements specification, an information service specification, and one or more solution set specifications. IRPAgents 6050 is another 3GPP architectural concept that encapsulates a well-defined subset of network element functions. The IRPAgent 6050 interacts with IRPManagers, such as IRPManager 6080 using one or more IRPs. In sum, the IRPManager 6080 and IRPAgent 6050 implement a set of management functionality over the Itf-N 6030.

The IRPManager 6080 of NM 6020 coordinates the COC functionality by identifying a cell outage and reconfiguring other neighboring cells to compensate for the outage. The cell outage may be identified using alarms generated by the eNodeBs or by statistics which indicate that the cell is handling less traffic than it should be for the time period. Once the cell outage is detected, the NM reconfigures one or more of the neighboring cells.

According to some examples, when a neighboring cell is reconfigured to compensate for another cell, one or more data structures describing the cell may be modified to indicate that it is compensating for a neighbor cell. In some examples, this data structure may be stored as part of the Information Object Classes (IOC) describing a cell in the database stored on the eNodeB. The NM may receive a notification from the neighboring cell that it has changed its status to indicate that it is compensating for the cell experiencing the outage. In some examples the NM may store this changed status locally, in other examples the NM may contact the IRPAgent 6050 of the cell experiencing the outage to determine the compensation status of that cell to determine if more than one cell needs to be compensated for.

Figure 7:
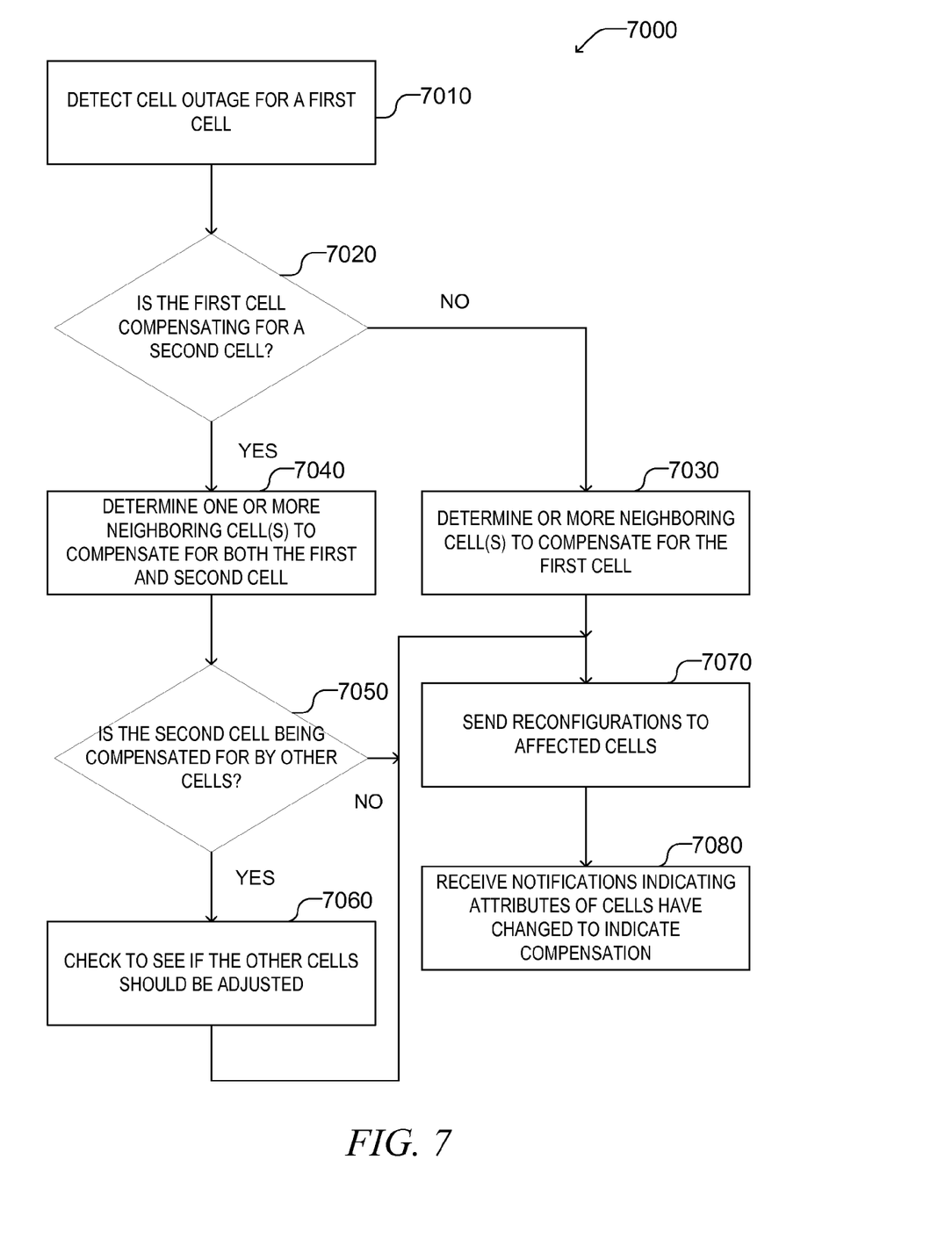
FIG. 7 shows a flowchart of a method for cell outage compensation from the point of view of an IRPManager according to some examples of the present disclosure.

Turning now to FIG. 7 a flowchart of a method 7000 for COC compensation from the point of view of an IRPManager according to some examples of the present disclosure is shown. At operation 7010 a cell outage is detected by the COC system for a first cell. This outage may be detected based upon a fault sent from a base station (e.g., an enhanced node b (eNodeB)), an analysis of statistical data associated with the cell, an operator identifying the outage, or the like. For example, statistical data may show that a cell that is normally busy is experiencing little to no usage. In other examples, there may be activity on the cell, but throughput is low, suggesting an overloaded cell.

At operation 7020, in some examples, the COC system may determine whether the first cell that is experiencing an outage condition is compensating for another cell. This may be done in some examples by querying the database for that cell on the eNodeB that provides that cell through the IRPAgent. In other examples, the management system for the COC functionality may store this state based upon previously sending a cell reconfiguration request to that eNodeB. If the first cell is not compensating for a second cell, at operation 7030, a reconfiguration of one or more neighboring cells of the first cell is determined to compensate for the outage of the first cell. The reconfiguration is sent to the affected cells at operation 7070 and one or more notifications may be received indicating that the database for the cells that were reconfigured have been updated to store an indication that they are compensating for another cell.

If at operation 7020, the first cell is compensating for a second cell, at operation 7040, a reconfiguration of one or more neighboring cells is determined to compensate for both the first and the second cell. At operation 7050, if the second cell is being compensated for by more than one cell (e.g., cell one and some other cell), a reconfiguration may be desired for those other cells. For example, if cell A is being compensated for by cell B and cell C and if cell B experiences an outage, Cell D may be reconfigured to exclusively compensate for cell A, and thus cell C may be reconfigured to exclusively compensate for cell B. If so, at operation 7060 the reconfiguration may be determined if desired. At operation 7070 the reconfiguration of the cells is initiated by sending requests to the base stations which provide the affected cells. In some examples, at operation 7080, these cells reconfigure accordingly and set indicators in their database to indicate that the cell is compensating for one or more other cells. When this status is set, in some examples, the base stations may send notifications indicating that they are now compensating.

These notifications may utilize existing status fields in the Information Object Classes (IOCs) that make up the IRP defining the COC feature. For example, the cOCStatus attribute holds information about cell outage compensation activities for a particular cell. The previous states were cOCActivating to indicate that COC was starting to compensate for that particular cell, cOCActive indicates that all activities to activate the compensation have been completed and the cell is being compensated for, cOCDeactivating indicates that the outage is over and activities to remove the compensation are complete, and cOCDeactive is the default state indicating no compensation for this cell. A new value can be added called cOCCompensating to indicate that this cell is compensating for another cell. When a cell begins compensation of a neighboring cell experiencing an outage, the cOCStatus attribute should change to cOCCompensating and when a cell ends compensation of a neighboring cell, the state should change back to cOCDeactive.

Figure 8:
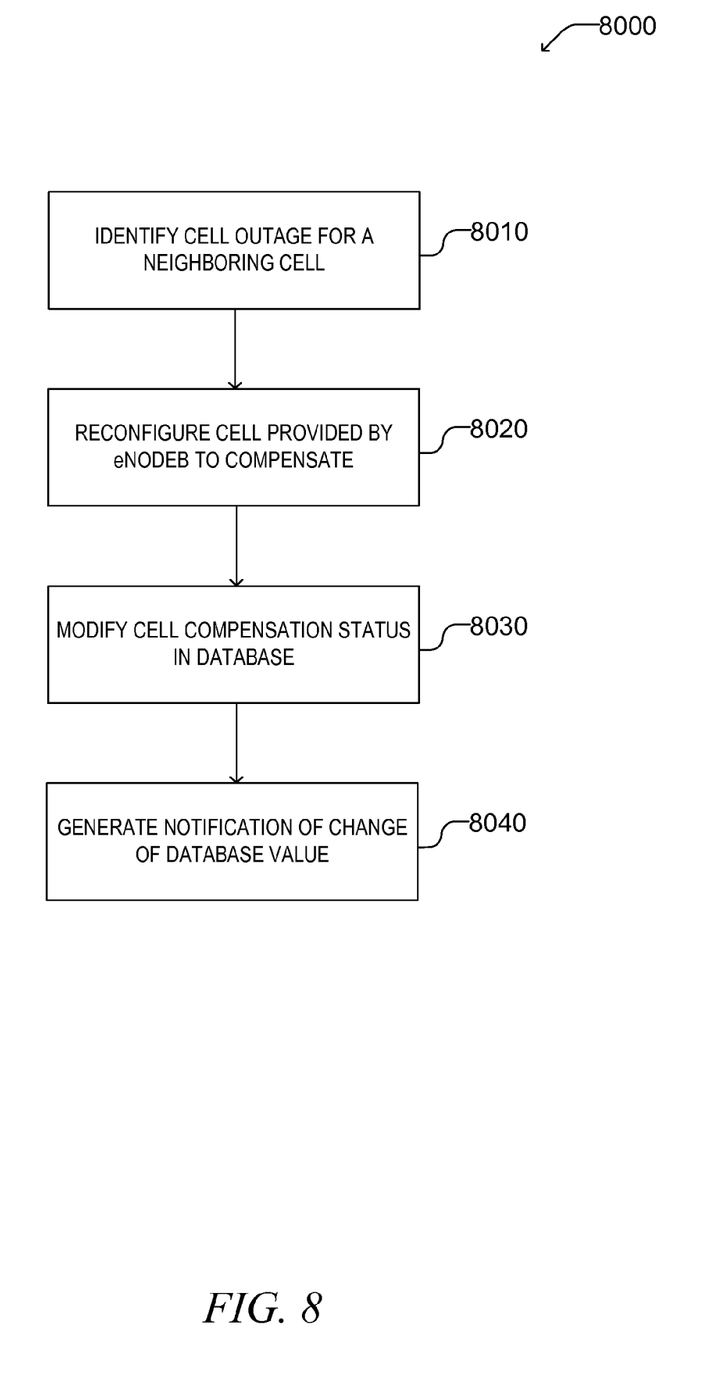
FIG. 8 shows a flowchart of a method for cell outage compensation from the point of view of an IRPAgent according to some examples of the present disclosure.

Turning now to FIG. 8, a flowchart of a method 8000 of COC from the point of view of an IRPAgent according to some examples of the present disclosure is shown. At operation 8010 the IRPAgent may identify a cell outage for a neighboring cell. In some examples this identification is a message from the IRPManager, for example, a message indicating that the IRPAgent should reconfigure a cell on the eNodeB to compensate for the cell experiencing the outage. At operation 8020, the eNodeB reconfigures the cell to compensate for the cell experiencing the outage. At operation 8030, the eNodeB modifies the cell compensation status (in some examples cOCstatus) to indicate that it is compensating for the cell experiencing the outage (e.g., cOCstatus=cOCCOmpensating). In other examples, the cell id of the cell it is compensating for may also be noted. At operation 8040, in some examples, a notification is generated that a database value has been changed. This notification may be sent to the IRPManager over the Itf-N interface.

Figure 9:
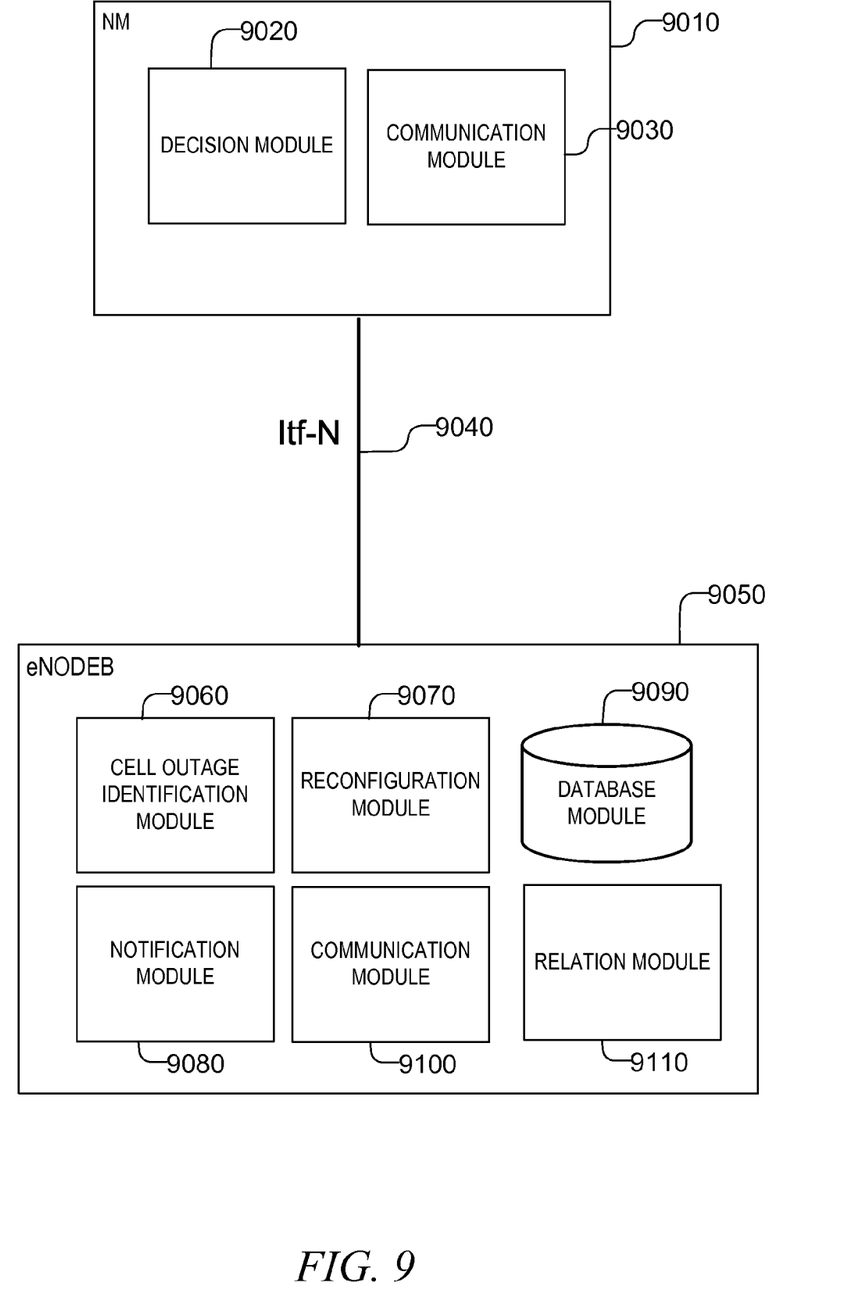
FIG. 9 shows a schematic of an example NM and eNodeB according to some examples of the present disclosure.

FIG. 9 shows a schematic of an example NM 9010 and eNodeB 9050 according to some examples of the present disclosure. NM 9010 may include modules such as a decision module 9020 and a communication module 9030. Decision module 9020 may detect an ongoing cell outage in a first cell. The decision module 9020 may determine one or more second cells to reconfigure to compensate. For example, the selected cells may be a neighbor of the cell experiencing an outage that are capable of providing the compensation. The NM 9010 may already know this information in some examples. For example, since the NM 9010 may configure the neighbor relations of a cell, the NM 9010 may already know the neighbors of the cell experiencing the outage and may select one or more cells from the neighbor list for performing the compensating role. In other examples, NM 9010 may not have configured, or may not have stored the configuration of, the neighbor relations and so NM 9010 may query a relation module 9110 on the eNodeB 9050 to determine the neighbors of a particular cell provided by the eNodeB 9050. If the first cell is compensating for one or more third cells, the decision module 9020 may determine one or more second cells to reconfigure to compensate for both the cell experiencing the outage and any cells the cell experiencing the outage is compensating for. Decision module 9020 may detect the cell outage by receiving alarms from eNodeBs that are providing the cell. In other examples, the decision module 9020 may detect the cell outage by analysis of statistics which indicate that the cell is not handling a volume of traffic that is expected. Communication module 9030 may communicate over the Itf-N interface 9040 with one or more eNodeBs 9050. The communication module may be configured to send requests to reconfigure a cell to compensate for the cell, receive alarms from eNodeBs 9050, receive notifications that database attributes from a database stored at the eNodeB 9050 have changed, and the like. Communication module 9030 may also send requests for the values of one or more database parameters on the eNodeB 9050 and receive the values of those parameters as responses.

eNodeB 9050 may provide cellular connectivity to one or more UEs (not shown) through provisioning of a cell. eNodeB may include such modules as a cell outage identification module 9060 which may identify a cell outage of a neighboring cell. In some example, eNodeB may include such module such as relation module 9110, which as already explained, may identify its neighboring cells that may be able to perform the compensation role when it is in outage. In some examples, a cell outage of a neighboring cell may be identified based upon receipt of a message from the NM or from another eNodeB. Example messages may include a dedicated message indicating a neighboring cell is experiencing an outage, an alarm from the other eNodeB, a reconfiguration message to reconfigure the cell to compensate for the neighboring cell, or the like. Reconfiguration module 9070 processes any requests for reconfiguring any of the cells that are hosted by the eNodeB 9050 and reconfigures the cell. Database module 9090 may store data structures and fields that store status and configuration information of the eNodeB and of the cells provided by the eNodeB, among other things. For example, database module may store the Information Object Classes (IOC) for the cells configured on the eNodeB, including a cell compensation status that may be a per-cell status element which may be set to a value indicating that it is compensating for another cell. In some examples, the cell id of the cell it is compensating for may also be included. Notification module 9080 may create one or more notifications for transmission to the NM or other interested parties (e.g., IRPManagers). Notifications may include alarms (e.g., alarms indicating that a cell is experiencing an outage), notifications based upon a change in database fields, and the like. The communications module 9100 may transmit and receive messages across the Itf-N interface to NMs or other entities. The communications module 9100 may respond to a request for the current value of any one of the database parameters sent from the NM or other node, the communications module 9100 may also set values of the database based upon requests from the NM to set those values. Some or all of the functionality described by the cell outage identification module 9060, reconfiguration module 9070, notification module 9080, communication module 9100, and database module 9090 may comprise the IRPAgent. Similarly, some or all of the functionality of the decision module 9020 and communication module 9030 of the NM 9010 may comprise the IRPManager.

While 3GPP networks such as an LTE network have been described, one of ordinary skill in the art with the benefit of Applicants' disclosure will appreciate that the methods, systems, and machine readable mediums herein described may be applicable to other wireless networks. For example, a WiMax network defined by an Institute for Electronics and Electrical Engineers (IEEE) 802.16 family of standards, a Wireless Local Area Network (WLAN) standard such as a IEEE 802.11 family of standards, other cellular standards such as a Global System for Mobile Communication (GSM) family of standards, a Universal Mobile Telecommunication System (UMTS) family of standards, or the like.

Figure 10:
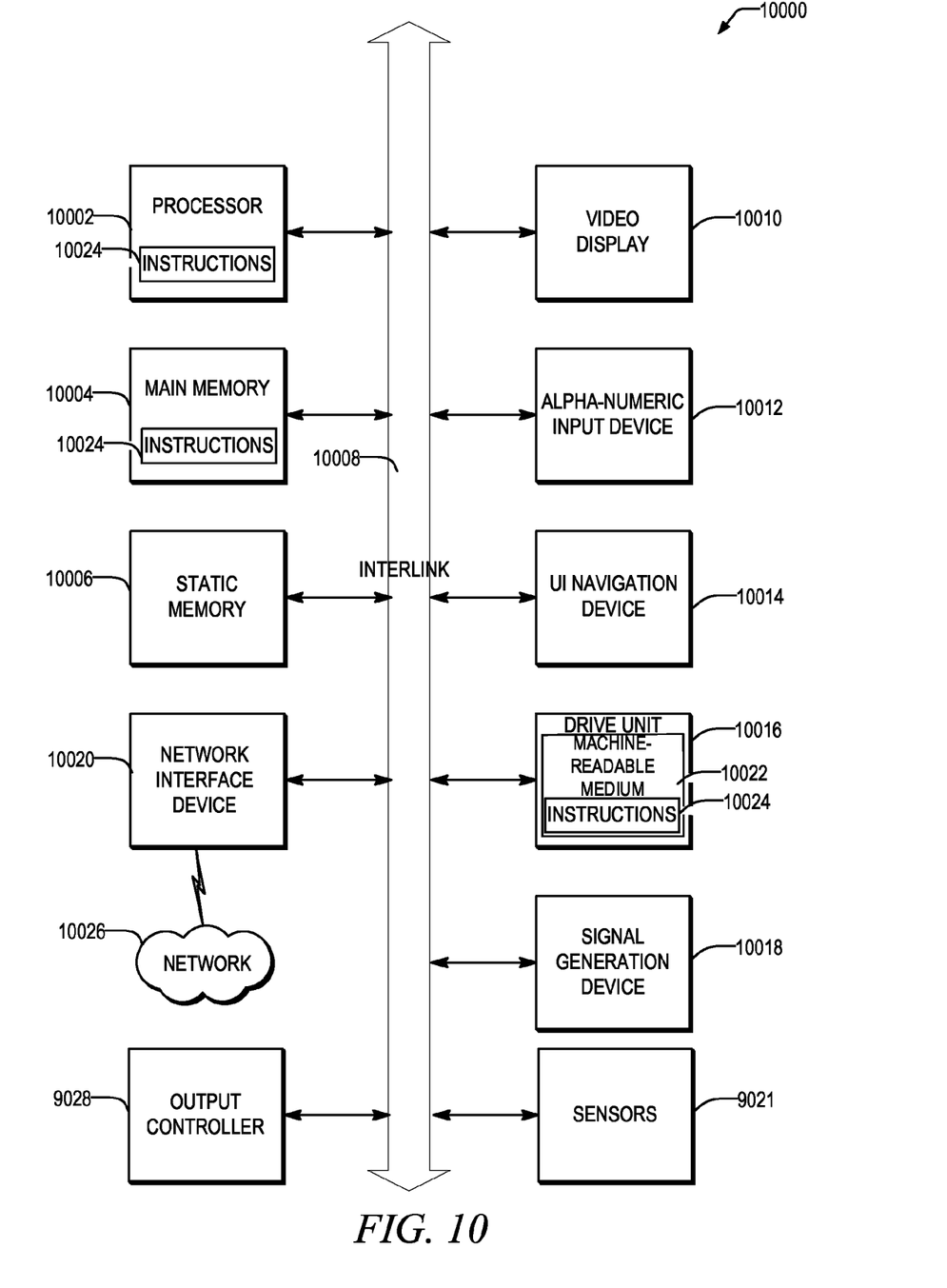
FIG. 10 is a block diagram illustrating an example of a machine upon which one or more embodiments may be implemented according to some examples of the present disclosure.

FIG. 10 illustrates a block diagram of an example machine 10000 upon which any one or more of the techniques (e.g., methodologies) discussed herein may perform. For example, any of the components of FIGS. 1-6 and 9 may be, or include portions of, machine 10000. In alternative embodiments, the machine 10000 may operate as a standalone device or may be connected (e.g., networked) to other machines. In a networked deployment, the machine 10000 may operate in the capacity of a server machine, a client machine, a base station, a network management station, or both in server-client network environments. In an example, the machine 10000 may act as a peer machine in peer-to-peer (P2P) (or other distributed) network environment. The machine 10000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 10000 may include a hardware processor 10002 (e.g., a central processing unit (CPU), a graphics processing unit (GPU), a hardware processor core, or any combination thereof), a main memory 10004 and a static memory 10006, some or all of which may communicate with each other via an interlink (e.g., bus) 10008. The machine 10000 may further include a display unit 10010, an alphanumeric input device 10012 (e.g., a keyboard), and a user interface (UI) navigation device 10014 (e.g., a mouse). In an example, the display unit 10010, input device 10012 and UI navigation device 10014 may be a touch screen display. The machine 10000 may additionally include a storage device (e.g., drive unit) 10016, a signal generation device 10018 (e.g., a speaker), a network interface device 10020, and one or more sensors 10021, such as a global positioning system (GPS) sensor, compass, accelerometer, or other sensor. The machine 10000 may include an output controller 10028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 10016 may include a machine readable medium 10022 on which is stored one or more sets of data structures or instructions 10024 (e.g., software) embodying or utilized by any one or more of the techniques or functions described herein. The instructions 10024 may also reside, completely or at least partially, within the main memory 10004, within static memory 10006, or within the hardware processor 10002 during execution thereof by the machine 10000. In an example, one or any combination of the hardware processor 10002, the main memory 10004, the static memory 10006, or the storage device 10016 may constitute machine readable media.

While the machine readable medium 10022 is illustrated as a single medium, the term "machine readable medium" may include a single medium or multiple media (e.g., a centralized or distributed database, and/or associated caches and servers) configured to store the one or more instructions 10024.

The term "machine readable medium" may include any medium that is capable of storing, encoding, or carrying instructions for execution by the machine 10000 and that cause the machine 10000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may also include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 10024 may further be transmitted or received over a communications network 10026 using a transmission medium via the network interface device 10020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 10020 may include one or more physical jacks (e.g., Ethernet, coaxial, or phone jacks) or one or more antennas to connect to the communications network 10026. In an example, the network interface device 10020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 10000, and includes digital or analog communications signals or other intangible medium to facilitate communication of such software.

OTHER EXAMPLES

The following are non-limiting examples.

Example 1 includes subject matter (such as a device such as an eNodeB, apparatus, or machine) comprising: a cell outage identification module configured to identify an ongoing cell outage of a neighboring cell; a reconfiguration module configured to reconfigure a cell provided by the eNodeB to compensate for the neighboring cell responsive to identifying an ongoing cell outage of the neighboring cell; a database module configured to modify a cell compensation status state for the cell provided by the eNodeB to indicate that the cell is compensating for the neighboring cell; and a notification module configured to generate a notification to a management entity indicating that the cell compensation status state has changed.

In example 2, the subject matter of example 1 may optionally include wherein the notification module sends the notification across an Interface N (Itf-N).

In example 3, the subject matter of any one of examples 1-2 may optionally include wherein the notification is sent to an IRPManager.

In example 4, the subject matter of any one of examples 1-3 may optionally include, wherein the reconfiguration module is configured to change at least one of: a transmission power, an antenna tilt, and an antenna azimuth to reconfigure the cell.

In example 5, the subject matter of any one of examples 1-4 may optionally include, wherein the eNodeB includes a status module configured to reply to a status request indicating the cell compensation status of the cell.

In example 6, the subject matter of any one of examples 1-5 may optionally include, wherein the neighboring cell is a neighboring cell compensating for a second neighboring cell, and wherein the reconfiguration module is configured to reconfigure the cell to compensate for at least part of the neighboring cell and the second neighboring cell.

In example 7, the subject matter of any one of examples 1-6 may optionally include, wherein the cell outage identification module is configured to identify the cell outage based upon a message received over an Itf-N interface.

In example 8, the subject matter of any one of examples 1-7 may optionally include, wherein the message is a message indicating that the cell provided by the eNodeB is to be reconfigured to compensate for the neighboring cell.

In example 9, the subject matter of any one of examples 1-8 may optionally include, wherein the cell compensation status state is part of an Information Object Class (IOC).

Example 10 includes or may optionally be combined with the subject matter of any one of Examples 1-9 to include subject matter (such as a method, means for performing acts, machine readable medium including instructions, that when performed by a machine cause the machine to perform acts, or an apparatus configured to perform) comprising identifying an ongoing cell outage of a neighboring cell based upon a message received from a management component; modifying an operating parameter of a cell provided by an eNodeB to compensate for the neighboring cell responsive to identifying an ongoing cell outage of the neighboring cell; updating a cell compensation status state for the cell provided by the eNodeB to indicate that the cell is compensating for the neighboring cell; and notifying a management entity indicating that the cell compensation status state has changed.

In example 11, the subject matter of any one of examples 1-10 may optionally include, wherein the notification is sent across an Interface N (Itf-N).

In example 12, the subject matter of any one of examples 1-11 may optionally include, wherein the notification is sent to an IRPManager.

In example 13, the subject matter of any one of examples 1-12 may optionally include, wherein the operation parameter is one of: a transmission power, an antenna tilt, and an antenna azimuth.

In example 14, the subject matter of any one of examples 1-13 may optionally include, receiving a status request requesting the cell compensation status; responsive to receiving the status request, replying to the status request with the cell compensation status of the cell.

In example 15, the subject matter of any one of examples 1-14 may optionally include, wherein the neighboring cell is a neighboring cell compensating for a second neighboring cell, and wherein modifying the cell includes modifying the cell to compensate for at least part of the neighboring cell and the second neighboring cell.

In example 16, the subject matter of any one of examples 1-15 may optionally include, wherein the message received from the management component is received over an Itf-N interface.

In example 17, the subject matter of any one of examples 1-16 may optionally include, wherein the message is a message indicating that the cell provided by the eNodeB is to be reconfigured to compensate for the neighboring cell.

In example 18, the subject matter of any one of examples 1-17 may optionally include, wherein the cell compensation status state is part of an Information Object Class (IOC).

Example 19 includes or may optionally be combined with the subject matter of any one of Examples 1-18 to include subject matter (such as a device such as a network management entity, apparatus, or machine) comprising a decision module configured to: detect an ongoing cell outage for a first cell in a wireless network; and determine a reconfiguration of a second cell to compensate for the cell outage; and a communication module configured to: send a request to a network node controlling the second cell to compensate for the cell outage of the first cell; and receive a notification from the network node controlling the second cell indicating that an attribute of a database associated with the second cell has changed to a value indicating that the second cell is compensating for the cell outage of the first cell.

In example 20, the subject matter of any one of examples 1-19 may optionally include wherein the decision module is configured to determine the presence of a cell outage by utilizing cell statistics.

In example 21, the subject matter of any one of examples 1-20 may optionally include wherein the decision module is configured to determine the presence of a cell outage responsive to an alarm received by the communication module.

In example 22, the subject matter of any one of examples 1-21 may optionally include wherein the communication module is configured to receive a notification indicating that the second cell is no longer compensating for the cell outage of the first cell.

In example 23, the subject matter of any one of examples 1-22 may optionally include wherein the control module is configured to determine the presence of an outage at the second cell.

In example 24, the subject matter of any one of examples 1-23 may optionally include wherein the communication module is configured to query the second cell to determine that the second cell is compensating for the first cell.

In example 25, the subject matter of any one of examples 1-24 may optionally include wherein the control module is configured to determine one or more other cells to compensate for the first and second cells.

In example 26, the subject matter of any one of examples 1-25 may optionally include wherein the network management entity and the network node controlling the second cell communicate using an ITF-N interface.

In example 27, the subject matter of any one of examples 1-26 may optionally include wherein the network node controlling the second cell is an eNodeB.

Example 28 includes or may optionally be combined with the subject matter of any one of Examples 1-27 to include subject matter (such as a method, means for performing acts, machine readable medium including instructions that, when performed by a machine cause the machine to performs acts, or an apparatus configured to perform) comprising detecting an ongoing cell outage for a first cell in a wireless network; determining a reconfiguration of a second cell to compensate for the cell outage; sending a request to a network node controlling the second cell to compensate for the cell outage of the first cell; and receiving a notification from the network node controlling the second cell indicating that an attribute of a database associated with the second cell has changed to a value indicating that the second cell is compensating for the cell outage of the first cell.

In example 29, the subject matter of any one of examples 1-28 may optionally include determining the presence of a cell outage by at least utilizing cell statistics.

In example 30, the subject matter of any one of examples 1-29 may optionally include wherein detecting an ongoing cell outage for a first cell in the wireless network comprises determining the presence of the cell outage responsive to an alarm received.

In example 31, the subject matter of any one of examples 1-30 may optionally include receiving a notification indicating that the second cell is no longer compensating for the cell outage of the first cell.

In example 32, the subject matter of any one of examples 1-31 may optionally include determining the presence of an outage at the second cell.

In example 33, the subject matter of any one of examples 1-32 may optionally include querying the second cell to determine that the second cell is compensating for the first cell.

In example 34, the subject matter of any one of examples 1-33 may optionally include determining one or more other cells to compensate for the first and second cells.

In example 35, the subject matter of any one of examples 1-34 may optionally include, wherein the network management entity and the network node controlling the second cell communicate using an ITF-N interface.

In example 36, the subject matter of any one of examples 1-35 may optionally include, wherein the network node controlling the second cell is an eNodeB.

In example 37, the subject matter of any one of examples 1-36 may optionally include, the operating parameter of the cell can be modified to stop compensating for a neighbor cell that is no longer in outage.

In example 38, the subject matter of any one of examples 1-37 may optionally include, updating the cell compensation status state for the cell to indicate that the cell has stopped compensating for the neighboring cell.

What is claimed is:

1. An eNodeB comprising:
   a memory;
   at least one processor; and
   software, included in the memory and executed by the at least one processor, configured to:
      identify a cell outage of a neighboring cell;
      reconfigure a cell provided by the eNodeB to compensate for the neighboring cell responsive to identification of the cell outage of the neighboring cell;
      modify a cell compensation status state for the cell provided by the eNodeB to cOCCompensating to indicate that the cell is compensating for the neighboring cell; and
      generate a notification to a management entity to indicate that the cell compensation status state has changed,
      wherein the cell compensation status state is indicated in the notification in a cOCStatus attribute of an Information Object Class (IOC), the cOCStatus attribute indicating a cell compensation status state selected from the cOCCompensating state, a cOCActivating state to indicate that cell outage compensation was starting to compensate for the cell, a cOCActive state to indicate that the cell is being compensated for, a cOCDeactivating state to indicate that activities to remove the compensation of the cell are complete, and a cOCDeactive state to indicate a default state of no compensation for the cell.

2. The eNodeB of claim 1, wherein the software is further configured to send the notification across an Interface N (Itf-N).

3. The eNodeB of claim 1, wherein the notification is sent to an IRPManager.

4. The eNodeB of claim 1, wherein the neighboring cell is a neighboring cell to compensate for a second neighboring cell, and wherein software is further configured to reconfigure the cell to compensate for at least part of the neighboring cell and the second neighboring cell.

5. The eNodeB of claim 1, wherein the software is further configured to identify the cell outage based upon a message received over an Itf-N interface.

6. The eNodeB of claim 1, wherein the software is further configured to:
   identify a cell outage of the cell while the cell outage of the neighboring cell is occurring;
   reconfigure another cell provided by the eNodeB to compensate for the cell, while the cell outage of the neighboring cell is occurring, responsive to identification of the cell outage of the cell, taking into account that the neighboring cell is being compensating for by the cell, based on cell compensation status state of the cell;
   modify a cell compensation status state for the other cell provided by the eNodeB to cOCCompensating to indicate that the other cell is compensating for the cell and modify the cell compensation status state for the cell provided by the eNodeB to the cOCActive state; and
   generate a notification to the management entity to indicate that the cell compensation status state of the cell and a notification to the management entity to indicate that the cell compensation status state of the other cell has changed,
   wherein each notification comprises the cOCStatus attribute of the IOC.

7. A machine readable non-transitory storage medium, including instructions, which when performed by a machine, cause the machine to perform the operations comprising:
   identifying an ongoing cell outage of a neighboring cell based upon a message received from a management component;
   modifying an operating parameter of a cell provided by an eNodeB to compensate for the neighboring cell responsive to identifying an ongoing cell outage of the neighboring cell;
   updating a cell compensation status state for the cell provided by the eNodeB to cOCCompensating to indicate that the cell is compensating for the neighboring cell; and
   notifying a management entity indicating that the cell compensation status state has changed, wherein the cell compensation status state is indicated in a notification in a cOCStatus attribute of an Information Object Class (IOC), the cOCStatus attribute indicating a cell compensation status state selected from the cOCCompensating state, a cOCActivating state to indicate that cell outage compensation was starting to compensate for the cell, a cOCActive state to indicate that the cell is being compensated for, a cOCDeactivating state to indicate that activities to remove the compensation of the cell are complete, and a cOCDeactive state to indicate a default state of no compensation for the cell.

8. The machine readable non-transitory storage medium of claim 7, wherein the neighboring cell is a neighboring cell compensating for a second neighboring cell, and wherein the instructions for modifying the operating parameter of the cell include instructions, which when performed by the machine, cause the machine to perform the operations of modifying the cell to compensate for at least part of the neighboring cell and the second neighboring cell.

9. The machine readable non-transitory storage medium of claim 7, wherein the message received from the management component is received over an Itf-N interface.

10. The machine readable non-transitory storage medium of claim 9, wherein the message is a message indicating that the cell provided by the eNodeB is to be reconfigured to compensate for the neighboring cell.

11. A network management entity comprising:
   at least one processor; and
   software, executed via the at least one processor, to:
   detect an ongoing cell outage for a first cell in a wireless network;
   determine a reconfiguration of a second cell to compensate for the cell outage;
   send a request to a network node controlling the second cell to compensate for the cell outage of the first cell; and
   receive a notification from the network node controlling the second cell indicating that an attribute of a database associated with the second cell has changed to cOCCompensating to indicate that the second cell is compensating for the cell outage of the first cell,
   wherein the attribute is indicated in the notification and is a cOCStatus attribute of an Information Object Class (IOC), the cOCStatus attribute selected from cOCCompensating, cOCActivating to indicate that cell outage compensation was starting to compensate for the second cell, cOCActive to indicate that the second cell is being compensated for, cOCDeactivating to indicate that activities to remove the compensation of the second cell are complete, and a cOCDeactive state to indicate a default state of no compensation for the second cell.

12. The network management entity of claim 11 wherein the software is further configured to determine the presence of an outage at the second cell.

13. The network management entity of claim 12, wherein the software is further configured to query the second cell to determine that the second cell is compensating for the first cell.

14. The network management entity of claim 13, wherein the software is further configured to determine one or more other cells to compensate for the first and second cells.

15. The network management entity of claim 11, wherein the network management entity and the network node controlling the second cell communicate using an ITF-N interface.

16. The network management entity of claim 11, wherein the network node controlling the second cell is an eNodeB.

17. A machine readable non-transitory storage medium, including instructions, which when performed by a machine, cause the machine to perform the operations comprising:
   detecting an ongoing cell outage for a first cell in a wireless network;
   determining a reconfiguration of a second cell to compensate for the cell outage;
   sending a request to a network node controlling the second cell to compensate for the cell outage of the first cell; and
   receiving a notification from the network node controlling the second cell indicating that an attribute of a database associated with the second cell has changed to cOCCompensating to indicate that the second cell is compensating for the cell outage of the first cell,
   wherein the attribute is indicated in the notification and is a cOCStatus attribute of an Information Object Class (IOC), the cOCStatus attribute selected from cOCCompensating, cOCActivating to indicate that cell outage compensation was starting to compensate for the second cell, cOCActive to indicate that the second cell is being compensated for, cOCDeactivating to indicate that activities to remove the compensation of the second cell are complete, and a cOCDeactive state to indicate a default state of no compensation for the second cell.

18. The machine readable non-transitory storage medium of claim 17, wherein the operations further comprise:
   determining the presence of an outage at the second cell.

19. The machine readable non-transitory storage medium of claim 18, wherein the operations further comprise:
   querying the second cell to determine that the second cell is compensating for the first cell.

20. The machine readable non-transitory storage medium of claim 19, wherein the operations further comprise:
   determining one or more other cells to compensate for the first and second cells.

21. The machine readable non-transitory storage medium of claim 17, wherein the network management entity and the network node controlling the second cell communicate using an ITF-N interface.

22. The machine readable non-transitory storage medium of claim 17, wherein the network node controlling the second cell is an eNodeB.

* * * * *